(12) United States Patent
Brück et al.

(10) Patent No.: US 8,357,332 B2
(45) Date of Patent: Jan. 22, 2013

(54) DEVICE AND METHOD FOR EVAPORATING A REACTANT

(75) Inventors: Rolf Brück, Bergisch Gladbach (DE); Peter Hirth, Rösrath (DE); Thomas Härig, Neunkirchen-Seelscheid (DE); Marc Brugger, Neunkirchen (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 839 days.

(21) Appl. No.: 12/417,190

(22) Filed: Apr. 2, 2009

(65) Prior Publication Data

US 2009/0226356 A1 Sep. 10, 2009

Related U.S. Application Data

(63) Continuation of application No. PCT/EP2007/059714, filed on Sep. 14, 2007.

(30) Foreign Application Priority Data

Oct. 2, 2006 (DE) .......................... 10 2006 047 042

(51) Int. Cl.
*B01D 50/00* (2006.01)
(52) U.S. Cl. ...................................... 422/168; 422/528
(58) Field of Classification Search .................. 422/528, 422/530, 168, 608
See application file for complete search history.

(56) References Cited

U.S. PATENT DOCUMENTS

| 4,477,715 A | 10/1984 | Bell et al. |
| 6,442,932 B1 | 9/2002 | Hofmann et al. |
| 6,847,017 B2 | 1/2005 | Starck et al. |
| 2004/0104215 A1 | 6/2004 | Starck et al. |

FOREIGN PATENT DOCUMENTS

| DE | 198 18 448 A1 | 10/1999 |
| DE | 19855385 A1 | 6/2000 |
| DE | 202 16 509 U1 | 2/2004 |
| WO | 00/32914 A1 | 6/2000 |

OTHER PUBLICATIONS

Korean Office Action dated Dec. 30, 2010.
International Search Report, dated Feb. 1, 2008.

*Primary Examiner* — Edward Johnson
(74) *Attorney, Agent, or Firm* — Laurence A. Greenberg; Werner H. Stemer; Ralph E. Locher

(57) ABSTRACT

A device for evaporating at least one of the following reactants: a reducing agent precursor solution and a reducing agent precursor, includes at least one electrically heatable heating zone having at least one electrically operable heating element with a heating resistor that is self-regulated about a significant temperature. A method and the device for evaporating a reactant allow a simple control of an evaporation process, especially of a urea/water solution, to provide a reducing agent, especially in an SCR process. The heating resistors have a significant temperature that corresponds to a control temperature of the heating resistor. The need for additional control electronics can be removed by adjusting a correspondingly steep curve within a range.

8 Claims, 3 Drawing Sheets

DEVICE AND METHOD FOR EVAPORATING A REACTANT

CROSS-REFERENCE TO RELATED APPLICATION

This is a continuation, under 35 U.S.C. §120, of copending International Application No. PCT/EP2007/059714, filed Sep. 14, 2007, which designated the United States; this application also claims the priority, under 35 U.S.C. §119, of German Patent Application DE 10 2006 047 042.7, filed Oct. 2, 2006; the prior applications are herewith incorporated by reference in their entirety.

BACKGROUND OF THE INVENTION

Field of the Invention

The present invention relates to a device and a method for evaporating a reactant, such as in particular a reducing agent precursor or a reducing agent precursor solution. The invention may particularly preferably be used for providing reducing agents for the selective catalytic reduction (SCR) of nitrogen oxides in the exhaust gas of internal combustion engines. The invention may be used in particular for evaporating an aqueous urea solution.

The exhaust gas of internal combustion engines includes substances, the emission of which into the environment is undesired in many countries. For example, the exhaust gases of internal combustion engines often contain nitrogen oxides (NOx), the proportion of which in the exhaust gas can be reduced firstly through the use of engine-internal measures, such as for example the selection of a suitable operating point, and secondly through the use of exhaust-gas aftertreatment. In order to reduce of the proportion of nitrogen oxides in the exhaust gas of internal combustion engines, the process of selective catalytic reduction (SCR) is known, in which use is made of a reducing agent, such as for example ammonia, that acts selectively on the nitrogen oxides.

Ammonia is often added in the form of an ammonia precursor which can cleave ammonia or react to form ammonia. In that case, use is often made of an aqueous urea solution which can be easily stored in a low-risk manner and even carried on-board in mobile applications. If the solution is added to the exhaust gas in liquid form, components of the exhaust system, such as for example catalyst carrier bodies, can be damaged since the relatively cold water leads to punctiform cooling of the components. In order to eliminate the same, the reducing agent or the reducing agent precursor may also be added in the form of vapor. Such evaporation makes very high demands of the regulating technology to be used if highly dynamic systems are present in which the nitrogen oxide proportion in the exhaust gas can change quickly and therefore the addition of reducing agent must also take place in a highly dynamic fashion.

SUMMARY OF THE INVENTION

It is accordingly an object of the invention to provide a device and a method for evaporating a reactant, which overcomes the hereinafore-mentioned disadvantages of the heretofore-known devices and methods of this general type and with which simple regulation of evaporation is possible.

With the foregoing and other objects in view there is provided, in accordance with the invention, a device for evaporating at least one of the following reactants: a) a reducing agent precursor solution, and b) a reducing agent precursor. The device comprises at least one electrically heatable heating zone and at least one electrically operable heating element in the heating zone. The at least one electrically operable heating element has a resistance heater being self-regulating about a significant temperature.

In accordance with another feature of the invention, alternatively or in addition, the resistance heater has a curve of the electrical resistance which is a function of the temperature having at least one point of inflection. A self-regulating resistance heater is to be understood to mean a resistance heater which, through the use of a variation of its electrical resistance, maintains a certain temperature, the so-called significant or nominal temperature. The resistance heater involves in particular so-called PTC (positive temperature coefficient) resistors which have a temperature range in which the resistance with respect to temperature rises sharply, and in particular a range in which the gradient changes. A reducing agent is to be understood in this case in particular to mean a reducing agent for the selective catalytic reduction of nitrogen oxides. It is particularly preferable in this case for ammonia to be used as a reducing agent, such that the reducing agent precursor includes any substances which can react to form ammonia or which can cleave ammonia. Such a substance is to be understood in particular to mean an aqueous solution of at least one ammonia precursor. Such substances may, for example, involve aqueous urea solutions, as are marketed under the trademark "AdBlue", or solutions of urea and/or ammonium formate, as are marketed for example under the trademark "Denoxium."

The device according to the invention is preferably part of a device for the selective catalytic reduction of nitrogen oxides in the exhaust gas of an internal combustion engine, in which an SCR catalytic converter is provided downstream of the device for evaporation. It is preferable in this case for a hydrolysis catalytic converter, for the hydrolysis of a reducing agent precursor for forming reducing agent, to be provided between the device for evaporation and the SCR catalytic converter. In this case, an internal combustion engine is to be understood to mean both stationary internal combustion engines, such as for example in a combined heating and power plant, as well as mobile internal combustion engines, such as for example in motor vehicles, aircraft and water vehicles. The device according to the invention is preferably used in mobile applications, that is to say in motor vehicles, automobiles, utility vehicles, passenger motor vehicles, motorcycles, quadbikes, all terrain vehicles, water vehicles and aircraft.

A point of inflection is to be understood to mean a point in the curve of the electrical resistance as a function of the temperature at which the curve changes its curvature. At such points, the second derivative of the curve with respect to the temperature is zero.

The significant temperature is distinguished in that the curve of the electrical resistance at the significant temperature has a significant change in resistance. A significant change is to be understood in particular to mean a change by more than 1 Ohm/Kelvin. Within the context of this invention, the significant temperature is to be understood to mean the regulating temperature about which the self-regulating heat conductor regulates the temperature. In this case, the significant temperature preferably lies in the region of an operating temperature of the device according to the invention, that is to say substantially in a range of from 5° C. below to 5° C. above the operating temperature. In this case, self-regulating of the heating element is particularly advantageously provided as a result of the behavior of the curve at the significant temperature. The curve preferably has a positive gradient in the region as well as in the region of the point of inflection. This particularly advantageously results in a self-regulating resistance heater, since a positive gradient has the effect that the electrical resistance rises in the event of an increase in temperature. Due to the inverse proportionality of the heating power to the resistance, this leads to a reduction in the heating power and therefore to cooling in the direction of the nominal temperature.

In accordance with a further advantageous feature of the device of the invention, a curve of the electrical resistance has, as a function of the temperature, at least one point of inflection and the derivative of the curve of the electrical resistance has, in the region of the temperature of the point of inflection, a full width half maximum (FWHM) value of at most 40 K (Kelvin).

The full width half maximum value makes it possible to realize a very fast regulating circuit, since the steep change in resistance with respect to the temperature leads to fast regulation of a self-regulating electrical resistance heater. A full width half maximum value of at most 20 K, particularly preferably at most 10 K, is preferable in this case.

In accordance with an added advantageous feature of the device of the invention, the curve of the electrical resistance has a significant temperature which corresponds to an operating temperature of the heating zone.

It is thereby obtained that the temperature of the resistance heater always seeks to attain the operating temperature of the heating zone. A correspondence of the significant temperature to the operating temperature of the heating zone is in particular also understood to mean that the significant temperature is selected in such a way that, taking into consideration the structural layout of the heating element and in particular taking into consideration possible waste heat losses, the significant temperature has the effect that the heating zone is at the operating temperature when the resistance heater or the heating element is at the significant temperature. This may, for example, also be utilized in corresponding heating elements, in which the temperature of the point of inflection lies above the operating temperature, with a targeted dissipation of heat being initiated, in such a way that the significant temperature of the heating element substantially corresponds to the operating temperature of the heating zone.

In accordance with an additional advantageous feature of the device of the invention, the heating zone includes at least one of the following structures:

a) an evaporator volume suitable for evaporating the reactant, and b) a heating volume suitable for heating the evaporated reactant.

It is thus possible, through the use of the heating, to in particular also obtain an at least partial pyrolysis or thermolysis, that is to say a thermal breakdown, of the reducing agent precursor to form reducing agent.

In accordance with yet another advantageous feature of the device of the invention, the curve of the electrical resistance with respect to the temperature has, in the region of the significant temperature, a gradient of greater than 1 Ohm per Kelvin.

This gradient range has proven to be particularly advantageous. A gradient of less than 1 Ohm/K leads to slow regulating behavior of the resistance heater.

In accordance with yet a further advantageous feature of the device of the invention, at least one resistance heater is formed from at least one of the following materials:

a) a PTC (positive temperature coefficient) resistor;
b) a titanate ceramic;
c) a doped titanate ceramic; and
d) a barium titanate ceramic.

A PTC resistor increases its resistance in the event of an increase in temperature, at least in certain temperature ranges. Titanate ceramic and in particular doped titanate ceramic may be used in particular in their polycrystalline form as a PTC resistor. A barium titanate ceramic is to be understood in particular to mean $BaTiO_3$.

In accordance with yet an added advantageous feature of the device of the invention, the significant temperature of the curve lies in a range of from 140° C. to 180° C.

A temperature range in a range of from 140° C. to 150° C. is very particularly preferable in this case. At higher temperatures, the corresponding heating zone may become blocked, since undesired secondary reactions increasingly take place at such temperatures. An operating temperature in the temperature range from 140° C. to 150° C. and correspondingly selected ranges of the temperatures of the points of inflection have proven to be particularly advantageous in particular when using aqueous urea solutions. In this case, a substantially complete evaporation takes place, with a substantially complete evaporation being understood in particular to mean an evaporation of 95% by mass or more of the aqueous urea solution.

In accordance with yet an additional advantageous feature of the device of the invention, the significant temperature of the curve is at least 300° C.

This particularly advantageously involves a heating zone which may serve to heat an already-evaporated reducing agent precursor solution or reducing agent precursor. These temperatures lead in particular to an at least partial thermolysis and pyrolysis, such that a hydrolysis catalytic converter which is possibly provided downstream may be constructed to be smaller or may be dispensed with.

In accordance with again another advantageous feature of the device of the invention, the device includes at least one self-regulating resistance heater.

A self-regulating resistance heater is to be understood to mean a resistor which makes it possible without further regulating technology to basically maintain a nominal temperature. Self-regulating resistance heaters are to be understood in particular to mean PTC semiconductors or PTC resistors.

With the objects of the invention in view, there is also provided a method for evaporating at least one of the following reactants: a) a reducing agent precursor solution, and b) a reducing agent precursor. The method comprises providing an electrically operable heating element having at least one resistance heater being self-regulating about a significant temperature, and heating the reactant with the electrically operable heating element to a nominal temperature corresponding to the significant temperature.

The method according to the invention advantageously permits very simple, fast and effective regulation of the heating power of an evaporator for a reducing agent precursor and/or a reducing agent precursor solution.

In accordance with another preferred mode of the method of the invention, at least one resistance heater is self-regulating.

In accordance with another preferred mode of the method of the invention, the nominal temperature lies in a range of from 140° C. to 180° C., particularly preferably in a range of from 140 to 150° C., in particular when evaporating an aqueous urea solution.

These nominal temperatures have proven to be particularly advantageous since, in this case, a substantially complete evaporation of the reducing agent precursor solution takes place without deposits being formed as a result of secondary reactions in the heating zone.

In accordance with a further preferred mode of the method of the invention, the nominal temperature is at least 300° C.

Such a temperature has proven to be advantageous in particular for heating an evaporated reducing agent precursor solution, and as a result, for an at least partial thermolysis and/or pyrolysis of the reducing agent precursor to form reducing agent.

In accordance with an added preferred mode of the method of the invention, the reactant includes at least one of the following substances:
a) urea $((NH_2)_2CO)$;
b) ammonium formate $(HCOONH_4)$;
c) ammonium carbamate $(H_2NCOONH_4)$;
d) ammonium carbonate $((NH_4)_2CO_3)$;
e) ammonium bicarbonate $(NH_4HCO_3)$;
f) ammonium oxalate $((NH_4)_2(C_2O_4))$;
g) ammonium hydroxide $(NH_4OH)$;
h) cyanic acid (HOCN);
i) cyanuric acid $(C_3H_3N_3O_3)$;
j) isocyanic acid (HNCO);
k) ammonia $(NH_3)$; and
l) an ammonia precursor.

In particular, it is also possible in addition to at least one of these substances to also use derivatives of these substances. In this case, in addition to urea, substances are also preferable which effect a reduction of the melting point of an aqueous urea solution.

The details and embodiments described for the device according to the invention can be transferred and applied in the same way to the method according to the invention. The details and embodiments described for the method according to the invention can be transferred and applied in the same way to the device according to the invention.

Other features which are considered as characteristic for the invention are set forth in the appended claims.

Although the invention is illustrated and described herein as embodied in a device and a method for evaporating a reactant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, without the invention being restricted to the exemplary embodiments shown in the drawings.

DETAILED DESCRIPTION OF THE INVENTION

Figure 1:
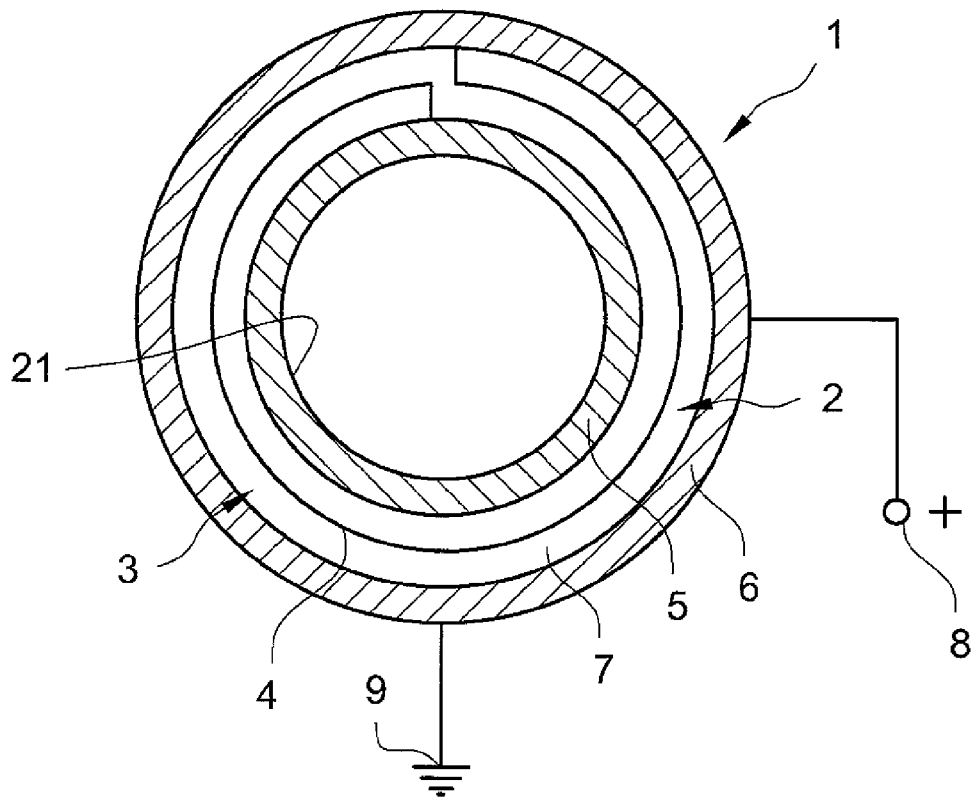
FIG. 1 is a diagrammatic, cross-sectional view of a first exemplary embodiment of a device according to the invention.

Referring now to the figures of the drawings in detail and first, particularly, to FIG. 1 thereof, there is seen a device 1 according to the invention for evaporating a reactant. The device 1 includes a heating zone 2 which can be electrically heated. The electric heating is realized through the use of at least one heating element 3 with a resistance heater 4. The heating element 3 is held between an inner tube 5 and an outer tube 6. In addition to the resistance heater 4, the heating element 3 may include an electrical insulation material 7, that is to say an electrical insulator. The tubes 5, 6 are connected in each case to different poles 8, 9 of a power supply. The heating element 3 is a self-regulating heating element, as explained in more detail below with reference to FIGS. 4 and 5.

Figure 2:
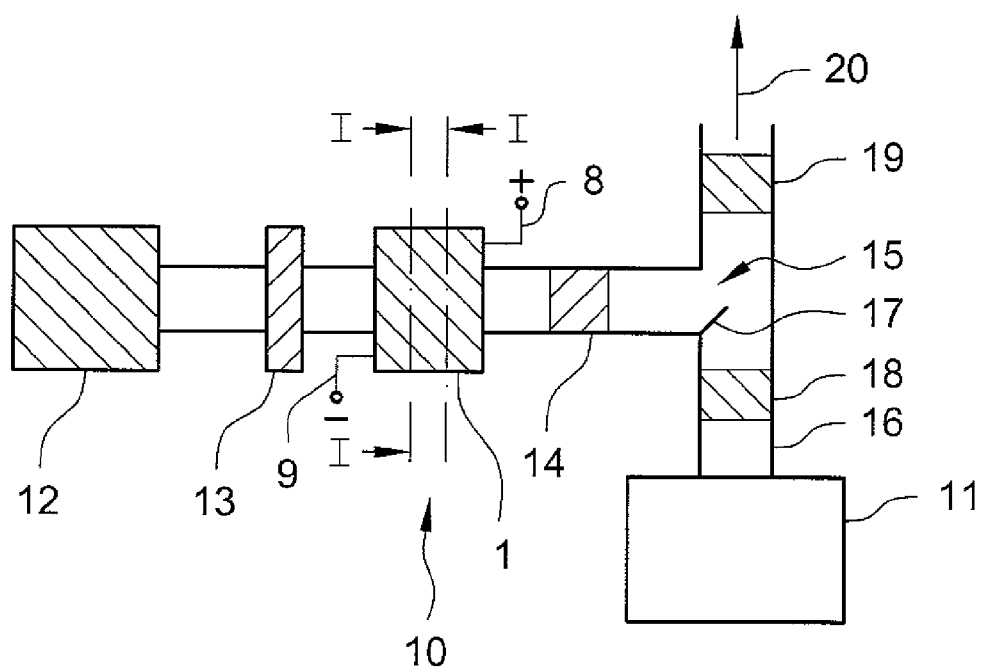
FIG. 2 is a sectional view of a device according to the invention as a part of a device for selective catalytic reduction.

FIG. 2 diagrammatically shows the device 1 according to the invention as part of a device 10 for the selective catalytic reduction of nitrogen oxides in the exhaust gas of an internal combustion engine 11. The device 10 for selective catalytic reduction includes a reservoir 12 and a delivery device 13 in addition to the device 1 according to the invention for evaporating at least one reactant. The reactant, in particular an aqueous urea solution, is stored in the reservoir 12 and is conveyed by the delivery device 13 to the device 1 for evaporation. An at least partial, preferably substantially complete, evaporation of the aqueous urea solution takes place in the device 1 for evaporation. The evaporated aqueous urea solution is conducted to a hydrolysis catalytic converter 14 in which the urea is hydrolyzed to form ammonia. A gas, which then contains ammonia, is introduced through an infeed point 15 into the exhaust line 16 of the internal combustion engine 11. A guide device 17 is optionally disposed in the region of the infeed point 15. It is possible to obtain a better introduction of the ammonia-containing gas mixture with the guide device 17. An oxidation catalytic converter 18 is provided upstream of the infeed point 15. Nitrogen monoxide (NO) can be oxidized through the use of the oxidation catalytic converter 18 to form nitrogen dioxide $(NO_2)$. The conversion rate of nitrogen oxides is thereby further increased.

An SCR catalytic converter 19 is provided downstream of the infeed point 15. The selective catalytic reduction of the nitrogen oxides takes place on the SCR catalytic converter 19. A purified exhaust-gas flow 20 leaves the SCR catalytic converter. The catalytic converters 14, 18, 19 are preferably formed of a catalytically active coating on catalyst carrier bodies, in particular on honeycomb bodies.

Figure 3:
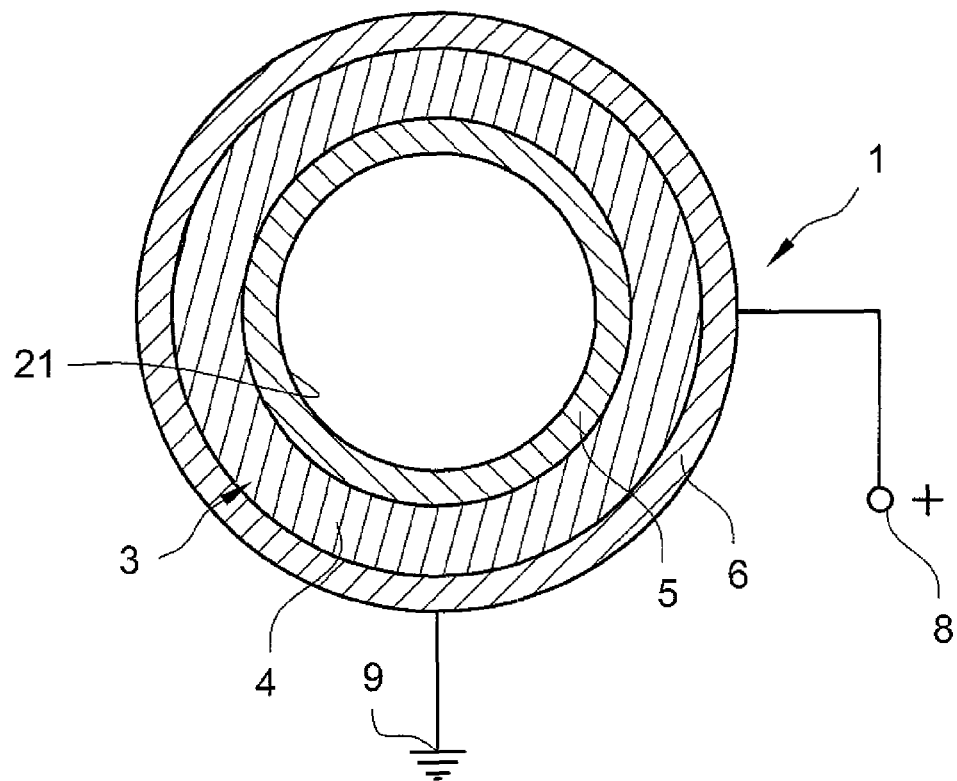
FIG. 3 is a cross-sectional view of a second exemplary embodiment of a device according to the invention.

FIG. 3 diagrammatically shows a second exemplary embodiment of a device 1 according to the invention for evaporating a reactant. Identical parts to those in FIG. 1 are denoted by the same reference symbols. In this case, in contrast to the first exemplary embodiment, the resistance heater 4 of the heating element 3 forms a layer which fills out an entire space between the inner tube 5 and the outer tube 6. It is also the case in FIG. 3 that the inner tube 5 and outer tube 6 are connected to corresponding poles 8, 9 of an electrical power supply. In this case, the reactant to be evaporated or the reactant which has already been evaporated flows through an evaporator volume 21.

Figure 4:
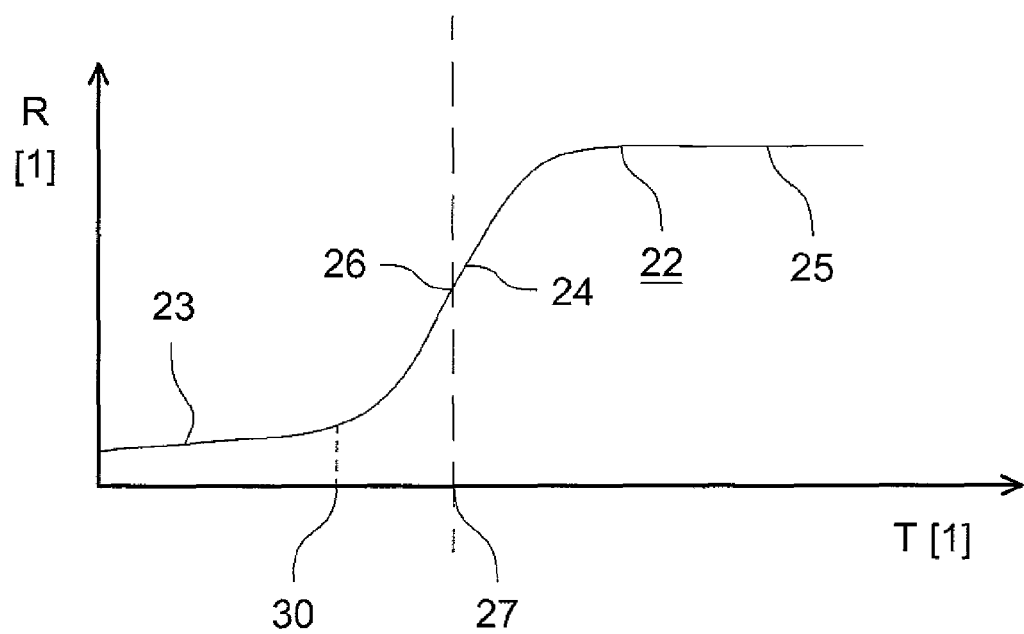
FIG. 4 is a diagram showing an exemplary curve of resistance with respect to temperature.

FIG. 4 shows, by way of example, a curve or course 22 of a resistance R in arbitrary units with respect to temperature T in arbitrary units. The resistance R is the resistance of the resistance heater 4. In this case, with increasing temperature T, the curve 22 rises sharply in a rising region 24 after a first plateau region 23. A transition from the first plateau region 23 into the rising region 24 corresponds to a significant temperature 30. At even higher temperatures, the rising region 24 is adjoined by a second plateau region 25. The curve 22 has, in the rising region 24, a point of inflection 26 which lies at a temperature 27 of the point of inflection 26. The significant temperature 30 corresponds, according to the invention, to a nominal temperature at which the reactant is evaporated.

In this case, the nominal temperature preferably lies, for aqueous urea solutions, in a range of from 140 to 150° C. for evaporation and, for an at least partial thermolysis or pyrolysis of the aqueous urea solution, at temperatures of 350° C. or higher.

Figure 5:
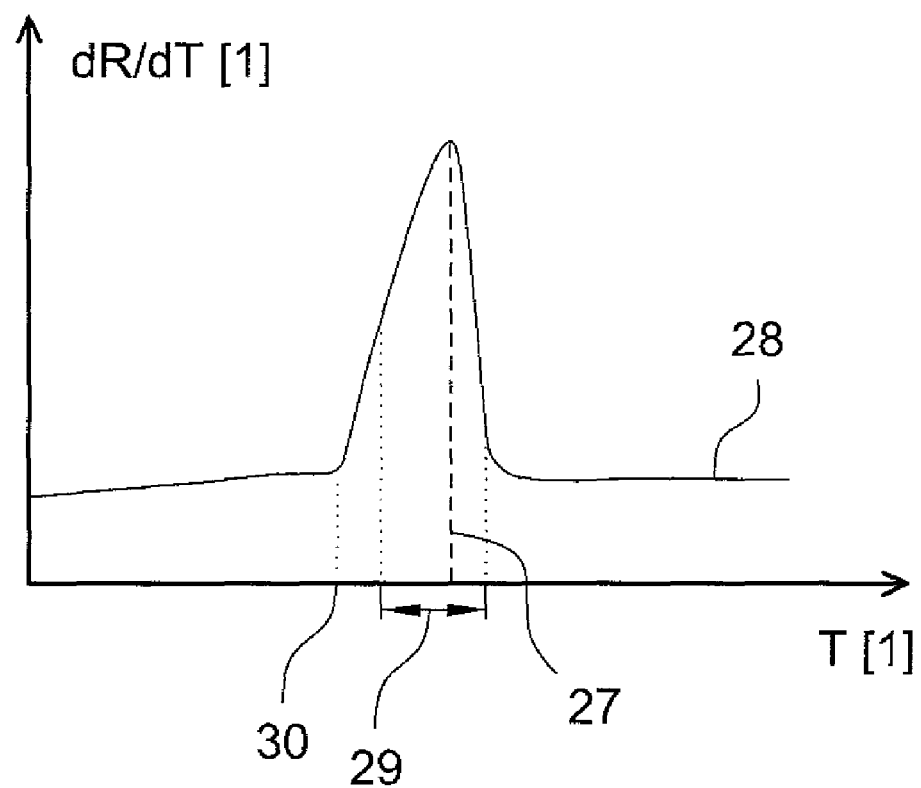
FIG. 5 is a diagram showing a curve of a derivative of the curve of the resistance with respect to temperature.

FIG. 5 graphically shows a derivative 28 of the curve 22 with respect to temperature. A maximum in the derivative 28 is present at the temperature 27 of the point of inflection 26. About that temperature 27, the derivative 28 has a full width half maximum value of 40 Kelvin or lower. A sharp increase in the gradient occurs at the significant temperature 30. For this purpose, the resistance heaters 4 are formed from corresponding materials, such as for example PTC conductors. An example of a corresponding material is a titanate ceramic doped with foreign atoms.

The method according to the invention and the device 1 according to the invention for evaporating a reactant advantageously permit simple regulation of an evaporation process, in particular of an aqueous urea solution, to provide reducing agent in particular in the SCR process. The resistance heaters 4 which are used have a significant temperature 30 which corresponds to a regulating temperature of the resistance heater. It is possible to dispense with further regulating techniques through the use of a correspondingly steep curve 22 in that region.

The invention claimed is:

1. A device for evaporating at least one reactant selected from the group consisting of:
    a) a reducing agent precursor solution, and
    b) a reducing agent precursor, the device comprising:
    at least one electrically heatable heating zone; and
    at least one electrically operable heating element in said heating zone, said at least one electrically operable heating element having a resistance heater being self-regulating about a significant temperature;
    wherein a curve of electrical resistance of said resistance heater has at least one point of inflection as a function of temperature, and a derivative of the curve of the electrical resistance has a full width half maximum (FWHM) value of at most 40 K (Kelvin) in a region of a temperature at the at least one point of inflection; and
    wherein the curve has a gradient of greater than 1 Ohm/K (Ohms per Kelvin) in the region of the significant temperature.

2. The device according to claim 1, wherein the significant temperature of the curve of electrical resistance corresponds to an operating temperature of said heating zone.

3. The device according to claim 1, wherein said heating zone includes at least one of the following structures:
    a) an evaporator volume suitable for evaporating the reactant; or
    b) a heating volume suitable for heating an evaporated reactant.

4. The device according to claim 1, wherein said resistance heater is formed from at least one of the following materials:
    a) a PTC (positive temperature coefficient) resistor;
    b) a titanate ceramic;
    c) a doped titanate ceramic;
    d) a barium titanate ceramic.

5. The device according to claim 2, wherein the significant temperature of the curve lies in a range of from 140° C. to 180° C.

6. The device according to claim 2, wherein the significant temperature of the curve is at least 300° C.

7. The device according to claim 1, wherein said resistance heater is at least one self-regulating resistance heater.

8. The device according to claim 1, wherein the device is configured for introducing the reactant to an exhaust gas in a form of a vapor.

* * * * *